June 24, 1924.

C. R. BELL 1,499,049

TIRE RIM

Filed Feb. 25, 1922

C. R. Bell INVENTOR

BY Victor J. Evans ATTORNEY

WITNESS:

June 24, 1924.
C. R. BELL
1,499,049
TIRE RIM
Filed Feb. 25, 1922
2 Sheets-Sheet 2
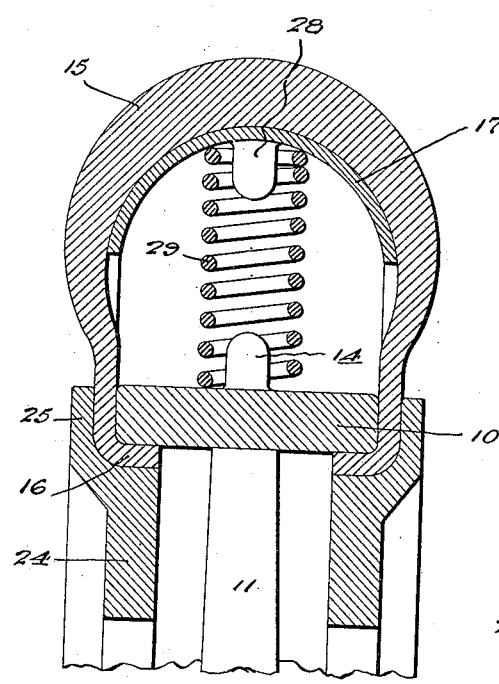
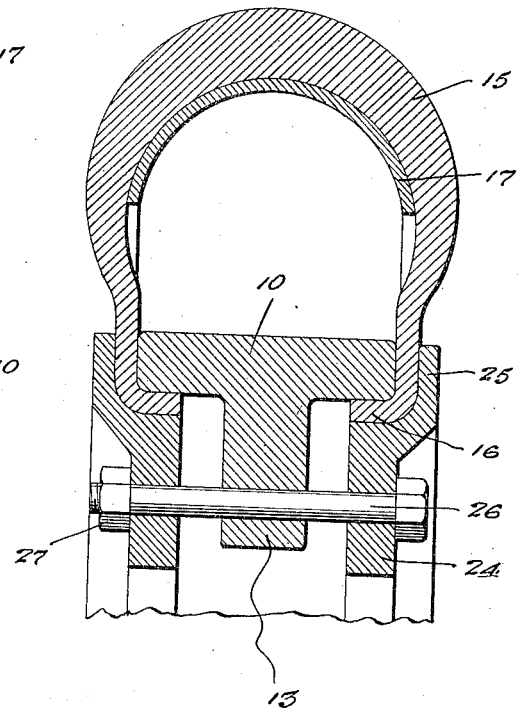
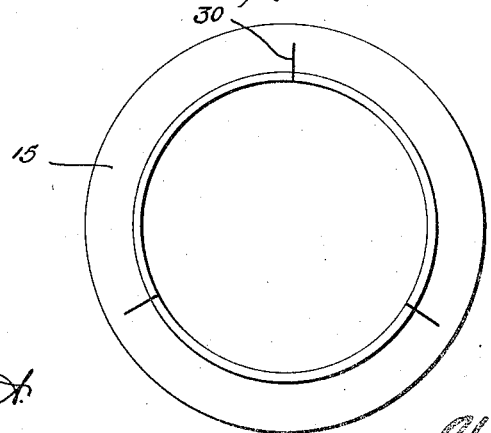
C. R. Bell
INVENTOR Patented June 24, 1924.

1,499,049

UNITED STATES PATENT OFFICE.

CHARLES R. BELL, OF LOS ANGELES, CALIFORNIA.

TIRE RIM.

Application filed February 25, 1922. Serial No. 539,180.

*To all whom it may concern:*

Be it known that I, CHARLES R. BELL, a citizen of the United States, residing at Los Angeles, in the county of Los Angeles and State of California, have invented new and useful Improvements in Tire Rims, of which the following is a specification.

This invention relates to resilient tires for use on automobiles and other vehicles and has for its object the provision of a tire which will possess all the advantages of the well known pneumatic type while being at the same time puncture-proof and also proof against blow-outs, rim cut and other ills to which the ordinary tire is subject.

An important and most specific object is the provision of a tire of this character which includes an outer casing similar in construction to the ordinary casing now used and within which is located a metal band engaged by a series of radially disposed coil springs which abut against a thick rim and which provides the necessary resilience to insure easy riding qualities.

A further object is the provision of a tire of this character in which the metallic band encasing the inner periphery of the casing is provided with means whereby its tension upon the casing may be varied to meet various conditions which might be met with depending upon the weight of the vehicle and the type and possibly the character of the surfaces to be traveled over.

An additional object is the provision of a tire of this character which will be simple and inexpensive in manufacture, easy to apply and remove, efficient and durable in service and a general improvement in the art.

With the above and other objects and advantages in view, the invention consists in the details of construction to be hereinafter more fully described and claimed, and illustrated in the accompanying drawing, in which:

Figure 2 is a cross sectional view taken on the line 2—2 of Figure 1.

Figure 3 is a cross sectional view taken on the line 3—3 of Figure 1.

Figure 6 is a side elevation of a modified form of casing used in connection with the structure.

Figure 1:
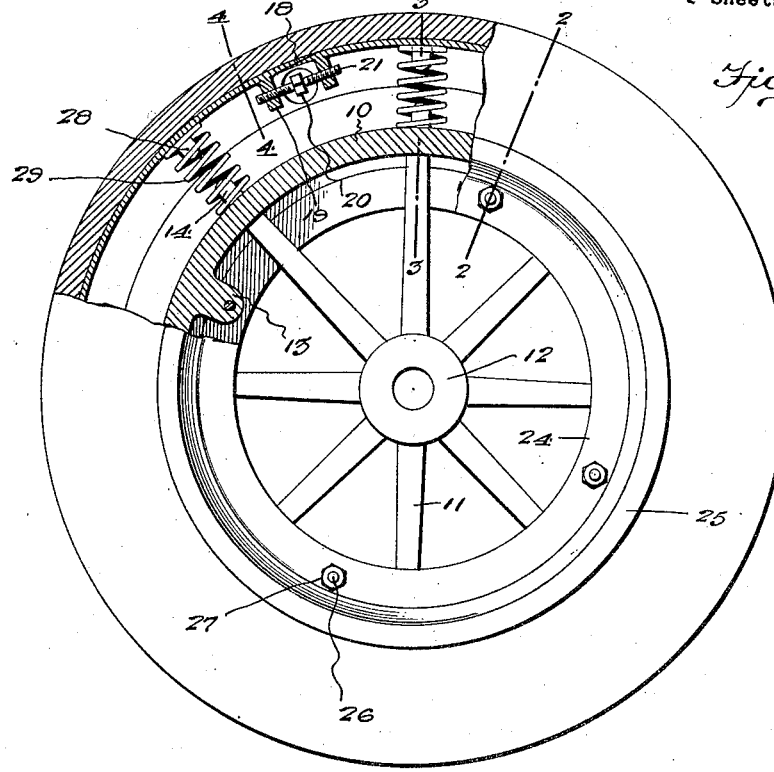
Figure 1 is a side elevation of a wheel equipped with my tire, parts being broken away and in section.
Figure 4:
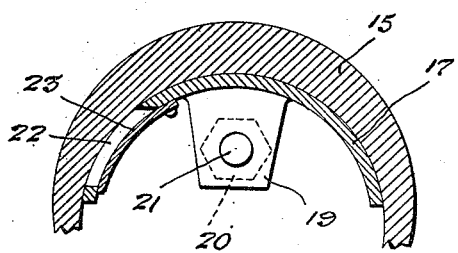
Figure 4 is a detail section taken on the line 4—4 of Figure 1.
Figure 5:
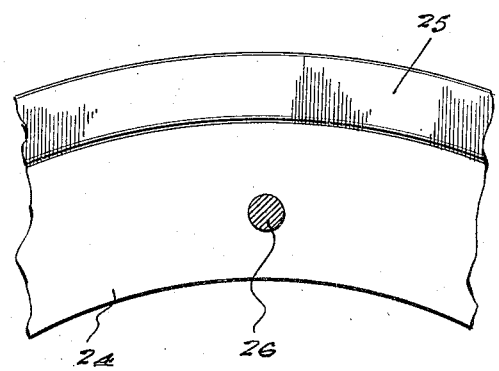
Figure 5 is a detail sectional view showing a fragment of one of the locking rings looking at the inside thereof.

Referring more particularly to the drawing, I have shown my tire in association with a rim 10 mounted upon the outer ends of spokes 11 which radiate from a hub 12. This rim is entirely different from the ordinary type of rim provided upon wheels of automobiles as it is purely cylindrical in shape, that is unprovided with any retaining flanges of any kind. Formed upon and projecting inwardly of the rim are extensions or ears 13 located at spaced intervals for a purpose to be described. Formed or secured upon the outer periphery of the rim at spaced intervals, preferably at points opposite the ends of the spokes 11 are projections 14 likewise for a purpose to be described.

The numeral 15 designates a casing which is constructed in a manner similar to the ordinary casing in common use, but which is provided at its edges with inwardly extending beads or flanges 16 which are extended at substantially right angles to the side walls. Disposed against the inner periphery of this casing is a split metallic band 17 which is arcuate in cross section for conforming engagement with the casing and which has its ends slightly overlapping and beveled as indicated at 18 for a purpose to be described. Formed or secured upon this band near the overlapping ends are ears 19 which are formed with threaded holes through which pass the threaded ends of a turn buckle structure including a nut 20 from the opposite sides of which extend reversely threaded stems 21. By turning this nut in one direction or the other it is apparent that the overlapping ends of the band 17 may be moved relatively to each other for slightly varying the diameter of the band. Access is had to this nut through a hole 22 formed in the band and normally closed by a movable cover 23.

In order to clamp the casing upon the rim, I provide at each side of the wheel clamping rings 24 which have their outer portions laterally offset to define flanges 25 which bear against the outer surfaces of the side walls of the casing opposite the points of contact thereof with the edges of the rim 10. These clamping rings are held in position by means of bolts 26 which pass transversely through them and through the ears 13 formed on the rim, these bolts carrying suitable nuts 27.

Mounted upon the inner periphery of the band 17 is a series of projections 28 upon which are engaged the outer ends of coil springs 29 which have their inner ends engaged upon the projections 14.

The wheel is assembled as follows:

Assuming that the springs 29 have been placed in position upon the projections 14, the band 17 is placed in encircling relation to the rim and with the projections 28 engaged within the outer ends of the coil springs, after which the nut member 20 is turned to expand or contract the band 17 as may be desired in order to place the springs under the proper compression. The casing 15 is then placed in position with its beads 16 engaged against the inner periphery of the rim 10, after which the clamping rings 24 are placed in position and secured by means of the bolts 26 and the nuts 27. In use, the tire will of course operate in exactly the same manner as any other tire, that is to say, it will have the necessary resilience to insure easy riding, but will have the great adavantage of being puncture-proof and incapable of blowing out as there is no air pressure whatever. It is obvious that the device will have manifest advantages over the ordinary tire in which use is made of an inflatable inner tube owing to the liability of such inner tube to be damaged in use as for instance by puncturing or blowing out.

In some instances it might be found somewhat difficult to place the casing in position but in order to take care of such a contingency I may find it advisable to provide the casing with a plurality of radially extending slits 30 which are arranged at spaced intervals and which are formed in only one side wall of the tire whereby to permit the tire to be more easily engaged upon the rim.

From the foregoing description and a study of the drawings it will be apparent that I have provided a resilient tire which will be very simple and inexpensive in manufacture, easy to apply, which will have long life and which will efficiently perform all the functions for which it is intended.

While I have shown and described the preferred embodiment of the invention, it is of course apparent that I reserve the right to make such changes in the form, construction and arrangement of parts as will not depart from the spirit of the invention or the scope of the subjoined claim.

Having thus described the invention I claim:

In combination with a wheel having a cylindrical rim, a resilient tire comprising a casing having its side walls engaged against the edges of said rim and formed at its edges with inwardly directed beads engaging against the inner periphery of the rim, inwardly extending apertured ears formed on the inner periphery of the rim, a pair of clamping rings disposed against the opposite sides of the casing and holding the same in engagement with the rim, and bolts passing through said rings and said ears.

In testimony whereof I affix my signature.

CHARLES R. BELL.